(12) United States Patent
Bleyer et al.

(10) Patent No.: US 9,804,960 B2
(45) Date of Patent: Oct. 31, 2017

(54) OVERPROVISION CAPACITY IN A DATA STORAGE DEVICE

(71) Applicant: Western Digital Technologies, Inc., San Jose, CA (US)

(72) Inventors: Aki Bleyer, Givataim (IL); Tal Heller, Aloney Abba (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 136 days.

(21) Appl. No.: 13/828,071

(22) Filed: Mar. 14, 2013

(65) Prior Publication Data
US 2014/0281126 A1 Sep. 18, 2014

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0643* (2013.01); *G06F 3/0644* (2013.01); *G06F 3/0679* (2013.01)

(58) Field of Classification Search
CPC .................... G06F 12/0246; G06F 12/0238
USPC ........................................................ 711/103
See application file for complete search history.

(56) References Cited

U.S. PATENT DOCUMENTS

| | | | | |
|---|---|---|---|---|
| 5,748,874 A | * | 5/1998 | Hicksted et al. | 714/24 |
| 2003/0051090 A1 | * | 3/2003 | Bonnett et al. | 711/1 |
| 2007/0022148 A1 | | 1/2007 | Akers et al. | |
| 2009/0077478 A1 | * | 3/2009 | Gillingham et al. | 715/763 |
| 2011/0099320 A1 | * | 4/2011 | Lucas et al. | 711/103 |
| 2013/0227236 A1 | * | 8/2013 | Flynn et al. | 711/165 |

FOREIGN PATENT DOCUMENTS

WO 2011031903 A2 3/2011

OTHER PUBLICATIONS

International Search Report and Written Opinion of the International Searching Authority (EPO) for International Application No. PCT/US20141018392, dated May 13, 2014, 11 pages.
International Preliminary Report on Patentability for International Application No. PCT/US2014/018392 dated Sep. 15, 2015, 8 pp.
International Preliminary Report on Patentability dated Sep. 15, 2015 in International Application No. PCT/US2014/018392, 8 pages.

* cited by examiner

*Primary Examiner* — Mano Padmanabhan
*Assistant Examiner* — William E Baughman
(74) *Attorney, Agent, or Firm* — Patterson & Sheridan, LLP

(57) ABSTRACT

A data storage module includes a non-volatile memory and a controller. A method performed in the data storage module includes receiving an overprovision capacity instruction from a host device. The method further includes updating a file system table of the non-volatile memory to indicate, by designating logical addresses in the file system table as being in use, that the logical addresses are used without reducing an amount of free physical space in the non-volatile memory.

29 Claims, 3 Drawing Sheets

US 9,804,960 B2

OVERPROVISION CAPACITY IN A DATA STORAGE DEVICE

FIELD OF THE DISCLOSURE

The present disclosure is generally related to data storage devices and more particularly to overprovision capacity in a data storage device.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data. For example, a user may store large audio files, images, videos, and other files at a data storage device.

As the data storage device nears a storage capacity, performance of the data storage device may be reduced. For example, when the data storage device stores a large amount of data (e.g., data corresponding to audio files, images, and/or videos), finding available memory space at which to write new data to the data storage device may consume time and may cause a user of the data storage device to perceive a "lag." To prevent users from perceiving such a lag, some devices adopt a "worst case" operating scenario and operate as if the devices are always at capacity (e.g., so that users do not perceive a lag corresponding to the actual amount of data stored at the device). However, such a technique may cause the devices to perform too slowly. Other devices may deny users access to the full storage capacity in order to avoid such a lag when the devices store large amounts of data. However, such devices may cause legal or public relations issues (e.g., if users are unhappy about not having access to the entire storage capacity).

SUMMARY

A data storage device includes a non-volatile memory portion, such as "overprovision capacity" that is indicated as being reserved (e.g., indicated as storing data) by a file system table of the data storage device even though the non-volatile memory portion does not store data. For example, the non-volatile memory portion may correspond to a logical address that is indicated as being reserved by the file system table but is not assigned a physical address by a memory management engine of the data storage device. Accordingly, the non-volatile memory portion may appear to the file system table as being used while not actually storing data, which may prevent the data storage device from performing more slowly when a large amount of data is stored at the data storage device. Further, a size of the non-volatile memory portion may be adjustable by the user to calibrate the size based on the particular needs of the user.

DETAILED DESCRIPTION

Figure 1:
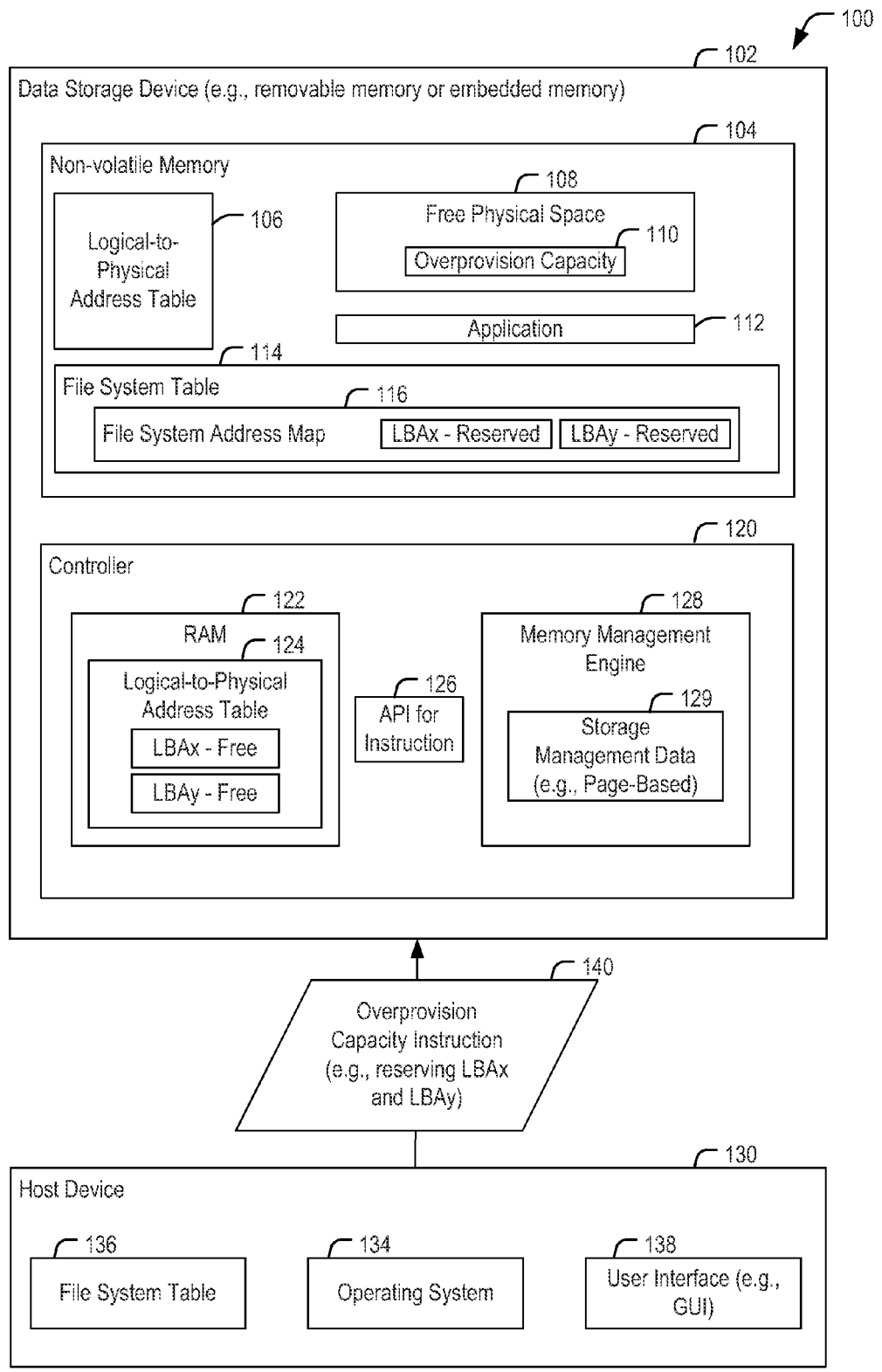
FIG. 1 is a block diagram of a particular illustrative embodiment of a system including a data storage device that includes an overprovision capacity.

FIG. 1 depicts a particular embodiment of a system 100 that includes a host device 130 and a data storage module, such as a data storage device 102. The particular example of FIG. 1 depicts that the data storage device 102 is external to (e.g., is removable from) the host device 130. For example, the data storage device 102 may be a removable memory that performs certain operations and methods described herein when operatively coupled (e.g., via an interface) to the host device 130. According to further embodiments, the data storage device 102 corresponds to an embedded memory that is included within (e.g., embedded within) the host device 130.

The data storage device 102 includes a non-volatile memory 104. The non-volatile memory 104 includes a logical-to-physical address table 106, free physical space 108 (e.g., unused physical memory blocks), and a file system table 114. The free physical space 108 includes an overprovision capacity 110. The non-volatile memory 104 may further include an application 112. The application 112 may be useable by the host device 130 to enable a user of the system 100 to configure a size of the overprovision capacity 110, as described further with reference to FIG. 2. The file system table 114 includes a file system address map 116.

The data storage device 102 further includes a controller 120. The controller 120 includes a random access memory (RAM) 122 having a logical-to-physical address table 124. The logical-to-physical address table 124 may correspond to a cached copy of the logical-to-physical address table 106. For example, upon a power-on event, the data storage device 102 may cache the logical-to-physical address table 106 at the RAM 122 to generate the logical-to-physical address table 124. During operation of the data storage device 102, the data storage device 102 may change entries of the logical-to-physical address table 124 (e.g., according to a page-based management technique), as described further below. Prior to a power-down event, the data storage device may write the logical-to-physical address table 124 to the non-volatile memory 104 (e.g., to update the logical-to-physical address table 106 based on the logical-to-physical address table 124).

The controller 120 further includes an application programming interface (API) 126 and a memory management engine 128. The memory management engine 128 is configured to maintain the logical-to-physical address table 124 according to storage management data 129. In a particular embodiment, the memory management engine 128 is configured to maintain the logical-to-physical address table 124 according to a page-based storage management technique.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 102 may be embedded memory in the host device 130, such as eMMC® (trademark of JEDEC Solid State Technology Association, Arlington, Va.) memory and eSD memory, as illustrative examples. To illustrate, the data storage device 102 may correspond to an eMMC (embedded MultiMedia Card) device. The data storage device 102 may operate in compliance with a Joint Electron Devices Engineering Council (JEDEC) industry specification. For example, the data storage device 102 may operate in compliance with a JEDEC eMMC specification, a JEDEC Universal Flash Storage (UFS) specification, one or more other specifications, or a combination thereof.

The host device 130 includes an operating system 134, a file system table 136, and a user interface 138, such as data corresponding to a graphical user interface (GUI). The host device 130 may be configured to provide data to be stored at the data storage device 102 or to request data to be read from the data storage device 102. For example, the host device 130 may include a mobile telephone, a music player, a video player, a gaming console, an electronic book reader, a personal digital assistant (PDA), a computer, such as a laptop computer, notebook computer, or tablet, any other electronic device, or any combination thereof. The host device 130 communicates via a memory interface that enables reading from the non-volatile memory 104 and writing to the non-volatile memory 104. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the non-volatile memory 104 in accordance with any other suitable communication protocol.

In operation, while the data storage device 102 is operatively coupled to the host device 130, the host device 130 may send an overprovision capacity instruction 140 to the data storage device 102. The overprovision capacity instruction 140 may indicate (e.g., reserve) a size of a portion of the non-volatile memory 104 to be unused. For example, the overprovision capacity instruction 140 may indicate a memory size (e.g., range) that is to be unused instead of identifying particular memory locations to be unused. In another embodiment, the overprovision capacity instruction 140 may designate one or more particular logical addresses associated with the non-volatile memory 104. An example of a logical address is a logical block address (LBA), such as illustrative logical block addresses "LBAx" and "LBAy" depicted in FIG. 1. In another embodiment, the overprovision capacity instruction 140 indicates a beginning logical address and a range (e.g., a memory size to begin at LBAx and span the range). In another embodiment, the overprovision capacity instruction 140 includes a "start" indicator that indicates to begin reserving logical addresses for a stream of data from the host device 130 until the host device 130 sends a "stop" indicator to the data storage device 102.

The data storage device 102 may receive the overprovision capacity instruction 140 (e.g., using the API 126) from the host device 130. Upon receiving the overprovision capacity instruction 140 from the host device 130, the data storage device 102 may update the file system table 114 to reserve the portion, as requested by the overprovision capacity instruction 140, by indicating logical addresses in the file system table 114 as storing data. For example, as depicted in FIG. 1, the file system address map 116 may indicate that LBAx and LBAy are reserved. Further, the data storage device 102 may update the file system table 114 to reserve the portion without reducing an amount of the free physical space 108 in the non-volatile memory 104. For example, although the overprovision capacity instruction 140 reserves a particular size of the non-volatile memory 104 (e.g., multiple LBAs), one or more logical addresses may be reserved (e.g., by the file system table 114, as shown) without writing to a physical address at the free physical space 108 corresponding to the one or more logical addresses. Accordingly, updating the file system table 114 may include modifying the file system address map 116 to indicate that an LBA that is received via the overprovision capacity instruction 140 (e.g., LBAx, LBAy, other logical addresses, or a combination thereof) is used (e.g., reserved).

The memory management engine 128 may maintain the logical-to-physical address table 124. According to at least a first embodiment, the memory management engine 128 maps logical address to physical addresses "all at once," and an LBA indicated by the overprovision capacity instruction 140 (e.g., LBAx and/or LBAy) is not assigned at the logical-to-physical address table 124 to any physical address of the non-volatile memory 104 in response to receiving the overprovision capacity instruction 140. According to at least a second embodiment, a unity mapping between logical and physical addresses is assumed. According to the second embodiment, the memory management engine 128 notes exceptions to the unity mapping (i.e., instead of noting the unity mapping itself), and physical addresses at the non-volatile memory 104 that are mapped to LBAx and LBAy are indicated at the logical-to-physical address table 124 as being available for data writes, as illustrated. According to at least a third embodiment, the memory management engine 128 dynamically tracks available physical addresses of the non-volatile memory 104 "on the fly" (e.g., "as needed") and physical addresses of the non-volatile memory 104 that are mapped to LBAx and LBAy are tracked at the logical-to-physical address table 124 as available for data writes. According to at least a fourth embodiment, the memory management engine 128 maps an LBA indicated by the overprovision capacity instruction 140 as assigned to a physical address and then "releases" (e.g., unmaps) the physical address.

Because the free physical space 108 may appear to the file system table 114 as being used while not actually storing data, performance of the data storage device 102 may appear more consistent irrespective of how much data is stored at the non-volatile memory 104. Accordingly, a user of the data storage device 102 may not experience a "lag" when the non-volatile memory 104 is near capacity. Further, a size of the overprovision capacity 110 may be adjustable by the user to calibrate the size of the overprovision capacity 110 based on the particular needs of the user, as described further with reference to FIG. 2.

Figure 2:
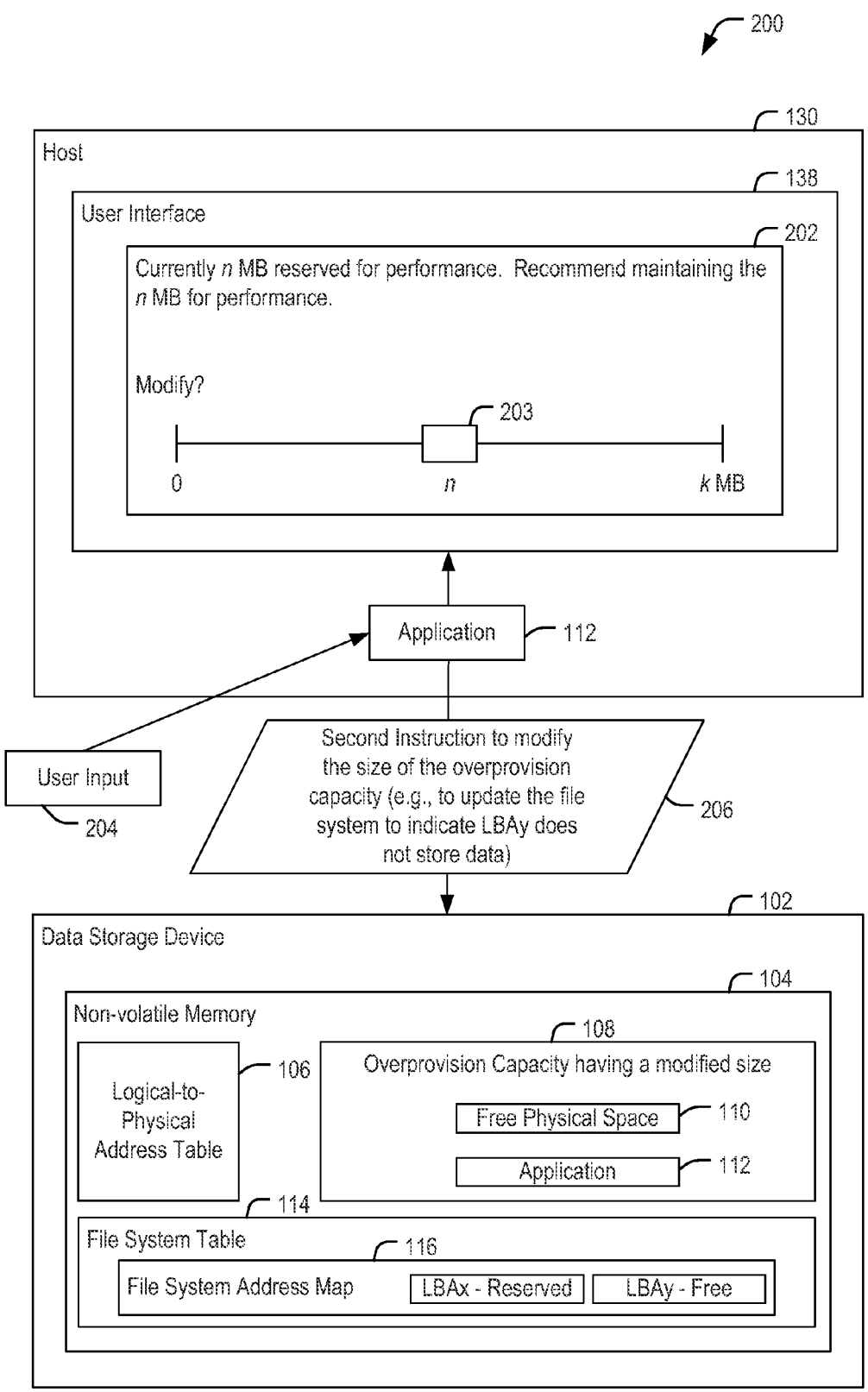
FIG. 2 is a block diagram illustrating user configuration of the overprovision capacity of the data storage device of the system of FIG. 1.

Referring to FIG. 2, a particular illustrative embodiment of the system 100 of FIG. 1 is depicted and generally designated 200. Certain components and operations of the system 200 of FIG. 2 may be described with reference to the system 100 of FIG. 1. For example, the system 200 of FIG. 2 includes the data storage device 102 and the host device 130. The host device 130 includes the user interface 138, illustrated in FIG. 2 as a graphical user interface (GUI) at a touchscreen device. The data storage device 102 includes the non-volatile memory 104 and the file system table 114. The non-volatile memory 104 includes the logical-to-physical address table 106 and the overprovision capacity 110 including the free physical space 108 and the application 112. The file system table 114 includes the file system address map 116. The data storage device 102 may further include the controller 120 of FIG. 1 (not shown in FIG. 2).

In the example of FIG. 2, the host device 130 further includes the application 112. For example, the application 112 may be loaded by the host device 130 from the non-volatile memory 104 of the data storage device 102, such as from the overprovision capacity 110 (as shown in FIG. 1), or from another region of the non-volatile memory 104. Alternatively, the application 112 may be loaded by the host device 130 from another source. As a particular example, the application 112 may be downloaded from the Internet and may not be stored at the data storage device 102 in order to increase an amount of the free physical space 108.

In operation, while the data storage device 102 is operatively coupled to the host device 130, the user interface 138 may present a user of the system 200 with a message 202. As depicted in FIG. 2, the message 202 indicates that of a size of a portion of the non-volatile memory 104 (i.e., n megabytes (MB) in the particular example of FIG. 2) of the data storage device 102 is currently reserved for performance (i.e., is unused). The size of the portion corresponds to the overprovision capacity 110. The message 202 may further include an indication of a recommended size of the portion reserved for performance (i.e., n MB in the example of FIG. 2, which may correspond to a "default" reserved size of the overprovision capacity 110).

FIG. 2 further depicts that the message 202 includes a prompt that enables the user of the system 200 to modify (e.g., increase or decrease) the size of the portion reserved for performance. In the particular example of FIG. 2, the user interface 138 presents a slideable indicator 203 that enables the user of the system 200 to modify the size of the portion between 0 and k MB. Accordingly, the host device 130 may receive user input 204 from the user of the system 200 to modify the size of the portion reserved for performance.

In response to the user input 204, the host device 130 may send a second instruction 206 (e.g., by executing the application 112) to the data storage device 102 to modify the size of the overprovision capacity 110. For example, in response to the user input 204 indicating a decrease in the size of the portion reserved for performance, the second instruction 206 may cause the data storage device 102 (e.g., using the API 126 of FIG. 1) to update the file system table 114 to modify the size of the overprovision capacity 110 based on the second instruction 206. Updating the file system table 114 may include updating the file system address map 116 to indicate that LBAy does not store data (i.e., to "unreserve" LBAy), as depicted in FIG. 2. FIG. 2 further illustrates that the overprovision capacity 110 has the modified size indicated by the second instruction 206. Alternatively, the user of the system 200 may increase the size of the overprovision capacity 110, or the user may not change the size of the overprovision capacity 110.

By enabling users of the system 200 to modify the size of the overprovision capacity 110, a tradeoff may be achieved between performance of the data storage device 102 and available storage at the data storage device 102. For example, a user of the system 200 may control (e.g., via the user interface 138) an amount of lag as the non-volatile memory 104 nears capacity by modifying the size of the overprovision capacity 110.

It should be appreciated that the overprovision capacity instruction 140 of FIG. 1 and the second instruction 206 of FIG. 2 may correspond to one or more instructions or techniques, depending on the particular application. For example, in at least one embodiment, the overprovision capacity instruction 140 and the second instruction 206 comply with a Joint Electron Devices Engineering Council (JEDEC) industry specification. As a particular example, the overprovision capacity instruction 140 may indicate JEDEC write, erase, and/or discard commands. The JEDEC write command may cause the data storage device 102 to modify the file system table 114 (e.g., to update the file system address map 116 to indicate that LBAx and LBAy are reserved, as described above) and the JEDEC erase command may cause the data storage device 102 to erase any data stored at the free physical space 108 in response to the JEDEC write command (if any, which may depend on the particular implementation). Alternatively, the overprovision capacity instruction 140 may correspond to another instruction that, when received by the data storage device 102 from the host device 130, causes the data storage device 102 to perform write and erase operations, such as the JEDEC write and erase operations, other operations, or a combination thereof. For example, the overprovision capacity instruction 140 may correspond to a dedicated "overprovision write" instruction that is reserved for such write and erase operations at the data storage device 102.

Further, it should be appreciated that the overprovision capacity 110 can be utilized according to a variety of techniques, depending on the particular application. For example, although free physical space need not be modified in response to overprovision capacity instruction 140, according to at least some embodiments, the free physical space can be used at least temporarily. For example, physical memory space of the non-volatile memory 104 corresponding to the overprovision capacity 110 can be configured according to any of various physical modes, such single-level cell (SLC), multiple-level cell (MLC), and tri-level cell (TLC) physical modes. In at least one embodiment, the overprovision capacity 110 can be utilized at least temporarily as a physical storage space (e.g., as an SLC cache). Further, the configuration of the overprovision capacity 110 can be adjusted dynamically (e.g., by the controller 120), such as in response to a change of size of the free physical space 108. As an example, the overprovision capacity 110 can be physically configured according to a "trim" command from the host device 130. Therefore, in addition to reducing or eliminating "lag" as the non-volatile memory 104 stores a large amount of data (i.e., as a size of the free physical space 108 is reduced), the overprovision capacity 110 can be configured to modify operating parameters at the data storage device 102, such as NAND characteristics, endurance, stability, data keeping time between refresh operations, other parameters, or a combination thereof.

Figure 3:
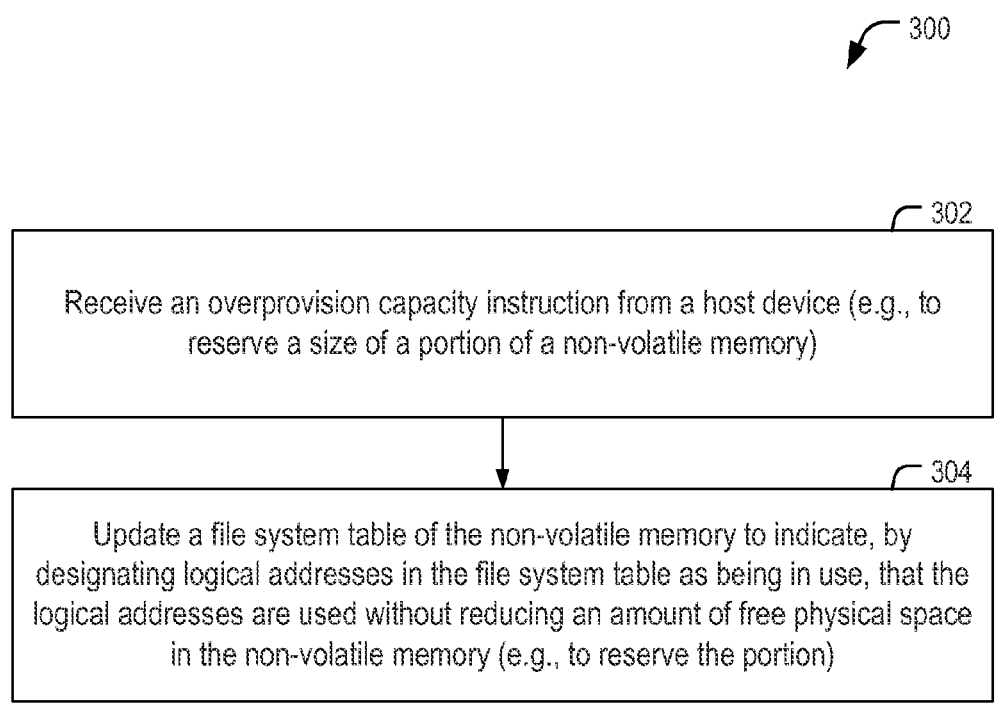
FIG. 3 is a flow chart of a particular illustrative embodiment of a method of that may be performed by the data storage device of FIG. 1.

FIG. 3 illustrates a particular embodiment of a method 300 that may be performed at the data storage device 102 of FIGS. 1 and 2. The method 300 includes receiving an overprovision capacity instruction (e.g., the overprovision capacity instruction 140) from a host device (e.g., the host device 130), at 302. For example, the overprovision capacity instruction may reserve a size of a portion (e.g., a size of the overprovision capacity 110, such as an amount of the free physical space 108) of a non-volatile memory. As a particular example, the overprovision capacity instruction may indicate that logical addresses LBAx and LBAy are to be reserved. The instruction may correspond to one or more commands that comply with a Joint Electron Devices Engineering Council (JEDEC) industry specification, such as JEDEC write and erase commands, as described above with reference to FIG. 2.

The method 300 further includes updating a file system table (e.g., the file system table 114) of the non-volatile memory to indicate that logical addresses are used, at 304. For example, the file system table may be updated by designating that the logical addresses are in use. As a further example, the logical addresses (e.g., LBAx, LBAy, one or more other logical addresses, or a combination thereof) may be indicated at the file system address map 116 of the file system table 114 as being reserved, as depicted in FIG. 1.

The file system table is updated without reducing an amount of free physical space (e.g., the free physical space 108) in the non-volatile memory. For example, the file system table may be updated to "reserve" the portion by indicating that logical addresses LBAx and LBAy store data without reducing an amount of free physical space at the non-volatile memory. As a result, logical memory address space (e.g., logical memory address space indicated at the file system table) is reduced. However, no physical blocks (e.g., physical blocks at the free physical space 108) are assigned to the logical addresses that are designated as being in use. Accordingly, the file system table is updated without reducing an amount of free physical space at the non-volatile memory.

The method 300 may further include dynamically configuring the overprovision capacity. For example, physical memory corresponding to the overprovision capacity may be dynamically configured as a cache (e.g., a single-level cell (SLC) cache), may be dynamically configured to operate according to modified operating parameters at the data storage device (e.g., a programming step size), or a combination thereof, as described above with reference to FIG. 2.

Although various components depicted herein are illustrated as block components and described in general terms, such components may include one or more microprocessors, state machines, or other circuits configured to enable the data storage device 102 to perform the particular functions attributed to such components, or any combination thereof. For example, components described herein, such as the controller 120 of FIG. 1, may represent physical components, such as hardware controllers, state machines, logic circuits, or other structures to enable the data storage device 102 of FIGS. 1 and 2 to control a size of the overprovision capacity 110, such as by reserving a size of the overprovision capacity 110 in response to receiving the overprovision capacity instruction 140 from the host device 130, by adjusting the size of the overprovision capacity 110 in response to receiving the second instruction 206 from the host device 130, or a combination thereof. In a particular embodiment, the controller 120 of FIG. 1 includes instructions that are executed by a processor and the instructions are stored at the non-volatile memory 104. Alternatively, or in addition, instructions that are executed by a processor may be stored at a separate memory location that is not part of the non-volatile memory 104, such as at a read-only memory (ROM) (not shown).

In a particular embodiment, the data storage device 102 may be a portable device configured to be selectively coupled to one or more external devices. For example, the data storage device 102 may be a removable device such as a Universal Serial Bus (USB) flash drive or a removable memory card, as illustrative examples. However, in other embodiments, the data storage device 102 may be attached to, or embedded within, one or more host devices, such as within a housing of a portable communication device. For example, the data storage device 102 may be within a packaged apparatus such as a wireless telephone, a personal digital assistant (PDA), a gaming device or console, a portable navigation device, a computer device, or other device that uses internal non-volatile memory. In a particular embodiment, the non-volatile memory 104 includes a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a data storage module with a non-volatile memory that stores a file system table, performing:
      receiving an overprovision capacity instruction from a host device, the overprovision capacity instruction indicating a logical address to store data corresponding to a physical address in the non-volatile memory;
      mapping the logical address indicated by the overprovision capacity instruction in a file system table as assigned to the physical address and un-mapping the physical address;
      transmitting a response that indicates that the logical address is in use when the file system table indicates that the corresponding physical address is not in use and not storing any data; and
      updating the file system table to indicate, by designating the logical address in the file system table as being in use, that the logical address is used without reducing an amount of free physical space in the non-volatile memory.

2. The method of claim 1, wherein updating the file system table includes modifying a file system address map to indicate that a logical block address (LBA) is used, and wherein the LBA is indicated by the overprovision capacity instruction.

3. The method of claim 2, wherein the data storage module includes a memory management engine that maintains a logical-to-physical address table, and wherein, after updating the file system table, the logical-to-physical address table does not indicate that the LBA is assigned to any physical address.

4. The method of claim 2, wherein the data storage module includes a memory management engine that maintains exceptions to a logical-to-physical unity mapping, and wherein, after updating the file system table, a physical address that is mapped at a logical-to-physical address table to the LBA is indicated as available for data writes.

5. The method of claim 2, wherein the data storage module includes a memory management engine that dynamically tracks available physical addresses of the non-volatile memory, and wherein, after updating the file system table, a physical address that is mapped at a logical-to-physical address table to the LBA is tracked as available for data writes.

6. The method of claim 1, wherein the overprovision capacity instruction reserves a size of the portion of the non-volatile memory, and wherein updating the file system table includes reserving the portion of the non-volatile memory.

7. The method of claim 6, wherein the portion of the non-volatile memory corresponds to an overprovision capacity of the non-volatile memory.

8. The method of claim 6, wherein the portion of the non-volatile memory corresponds to multiple logical block addresses (LBAs).

9. The method of claim 6, further comprising receiving a second instruction from the host device to modify the size of the portion of the non-volatile memory.

10. The method of claim 9, further comprising updating the file system table to modify the size of the portion of the non-volatile memory.

11. The method of claim 10, wherein updating the file system table to modify the size of the portion of the non-volatile memory includes updating a file system address map of the file system table.

12. A data storage device comprising:
a non-volatile memory that stores a file system table; and
a controller coupled to the non-volatile memory, wherein the controller is configured to:
receive an overprovision capacity instruction from a host device, the overprovision capacity instruction indicating a logical address to store data corresponding to a physical address in the non-volatile memory;
map the logical address indicated by the overprovision capacity instruction in a file system table as assigned to the physical address and un-mapping the physical address;
transmit a response that indicates that the logical address is in use when the file system table indicates that the corresponding physical address is not in use and not storing any data; and
update the file system table to indicate, by designating the logical address in the file system table as being in use, that the logical address is used without reducing an amount of free physical space in the non-volatile memory.

13. The data storage device of claim 12, wherein the data storage device includes a removable memory or an embedded memory.

14. The data storage device of claim 12, wherein:
the controller includes a memory management engine, and
the memory management engine is configured not to modify, in response to the overprovision capacity instruction, the amount of the free physical space in the non-volatile memory.

15. The data storage device of claim 14, wherein the memory management engine is further configured to manage storage at the non-volatile memory according to a page-based storage management technique.

16. The data storage device of claim 12, wherein the controller is further configured to update the file system table by modifying a file system address map to indicate that a logical block address (LBA) is used, and wherein the overprovision capacity instruction indicates a size of the portion of the non-volatile memory and indicates the LBA.

17. The data storage device of claim 16, wherein the controller is further configured to receive a second instruction from the host device to modify the size of the portion of the non-volatile memory.

18. The data storage device of claim 17, wherein the controller is further configured, in response to receiving the second instruction, to update the file system table to indicate that at least one of the logical addresses does not store data.

19. The data storage device of claim 18, wherein the non-volatile memory stores an application that is used by the host device to modify the size of the portion of the non-volatile memory.

20. The data storage device of claim 12, wherein the free physical space includes unused physical memory blocks of the non-volatile memory.

21. A method of managing a data storage device, the data storage device having a data storage capacity, the method comprising:
receiving at the data storage device an input from an electronic device, the input including either first information indicating a portion of the data storage capacity to be unusable by the electronic device and a logical address to store data corresponding to a physical address in the non-volatile memory or second information indicating at least a part of the data storage capacity previously allocated as unusable by the electronic device as usable;
configuring at the data storage device an over-provisioning storage capacity of the data storage device based on whether the input includes the first information or the second information;
in response to the input includes including the first information, mapping the logical address indicated by the overprovision capacity instruction in a file system table as assigned to the physical address and un-mapping the physical address and transmitting a response that indicates that the logical address is in use when the file system table indicates that the corresponding physical address is not in use and not storing any data and updating the data storage capacity based on the configured over-provisioning storage capacity, wherein the updated data storage capacity is used by a file system to update an amount of data to be stored in the data storage device; and
in response to the input including the second information, updating the data storage capacity to indicate that at least the part of the data storage capacity is available for use by the electronic device.

22. The method of claim 21, wherein the over-provisioning storage capacity is proportional to a performance of the data storage device.

23. The method of claim 22, wherein the over-provisioning storage capacity is configured using a range of memory addresses.

24. The method of claim 23, wherein the range of memory addresses includes a start logical block address (LBA) and an end LBA.

25. The method of claim 24, wherein the input comprises a user input.

26. The method of claim 21, wherein the over-provisioning storage capacity is configured as a cache to temporarily store data.

27. The method of claim 26, wherein a size of the cache is adjusted based on an unused amount of storage capacity of the updated data storage capacity.

28. The method of claim 21, wherein the input comprises an instruction indicating a size of the portion of the data storage device.

29. An apparatus comprising:
- means for storing data, the means for storing data having a data storage capacity;
- means for receiving an input from an electronic device, the input including either first information indicating a portion of the data storage capacity to be unusable by the electronic device and a logical address to store data corresponding to a physical address in the non-volatile memory or second information indicating at least a part of the data storage capacity previously allocated as unusable by the electronic device as usable;
- means for configuring an over-provisioning storage capacity of the means for storing data based on whether the input includes the first information or the second information; and
- means for mapping the logical address indicated by the overprovision capacity instruction in a file system table as assigned to the physical address and un-mapping the physical address and transmitting a response that indicates that the logical address is in use when the file system table indicates that the corresponding physical address is not in use and not storing any data and updating the data storage capacity based on the configured over-provisioning storage capacity in response to the input including the first information, wherein the updated data storage capacity indicates an updated amount of data to be stored in the means for storing data, and for updating the data storage capacity to indicate that at least the part of the data storage capacity is available for use by the electronic device in response to the input including the second information.

* * * * *